US006826527B1

(12) United States Patent
Unno

(10) Patent No.: US 6,826,527 B1
(45) Date of Patent: Nov. 30, 2004

(54) CONCEALMENT OF FRAME ERASURES AND METHOD

(75) Inventor: Takahiro Unno, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 450 days.

(21) Appl. No.: 09/705,356

(22) Filed: Nov. 3, 2000

Related U.S. Application Data

(60) Provisional application No. 60/167,197, filed on Nov. 23, 1999.

(51) Int. Cl.[7] .................. G01L 19/12

(52) U.S. Cl. .................. 704/223; 704/226; 704/205; 704/215; 704/264; 704/225; 714/752

(58) Field of Search .................. 704/223, 206, 704/225, 264, 207, 205, 215, 226; 375/350; 502/335; 714/752

(56) References Cited

U.S. PATENT DOCUMENTS

| | | | | | |
|---|---|---|---|---|---|
| 5,450,449 | A | * | 9/1995 | Kroon | 375/350 |
| 5,495,555 | A | * | 2/1996 | Swaminathan | 704/207 |
| 5,699,485 | A | * | 12/1997 | Shoham | 704/223 |
| 5,732,389 | A | * | 3/1998 | Kroon et al. | 704/223 |
| 5,763,363 | A | * | 6/1998 | Schulz et al. | 502/335 |
| 5,960,389 | A | * | 9/1999 | Jarvinen et al. | 704/264 |
| 6,269,331 | B1 | * | 7/2001 | Alanara et al. | 704/205 |
| 6,295,520 | B1 | * | 9/2001 | Tian | 704/223 |
| 6,377,915 | B1 | * | 4/2002 | Sasaki | 704/206 |
| 6,418,408 | B1 | * | 7/2002 | Udaya Bhaskar et al. | 704/225 |

FOREIGN PATENT DOCUMENTS

| | | | | |
|---|---|---|---|---|
| JP | 08-130532 | * | 5/1996 | H04L/7/00 |
| JP | 2001-154699 | * | 6/2001 | G10L/19/12 |

OTHER PUBLICATIONS de Martin et al ("Improved Frame Erasure Concealment For CELP–Based Coders", IEEE International Conference on Acoustic Speech, and Signal Processing, Jun. 2000).*

* cited by examiner

*Primary Examiner*—Richemond Dorvil
*Assistant Examiner*—Daniel Nolan
(74) *Attorney, Agent, or Firm*—Carlton H. Hoel; W. James Brady; Frederick J. Telecky, Jr.

(57) ABSTRACT

A decoder for code excited LP encoded frames with both adaptive and fixed codebooks; erased frame concealment uses muted repetitive excitation, threshold-adapted bandwidth expanded repetitive synthesis filter, and jittered repetitive pitch lag.

7 Claims, 2 Drawing Sheets

FIG. 3 (PRIOR ART)
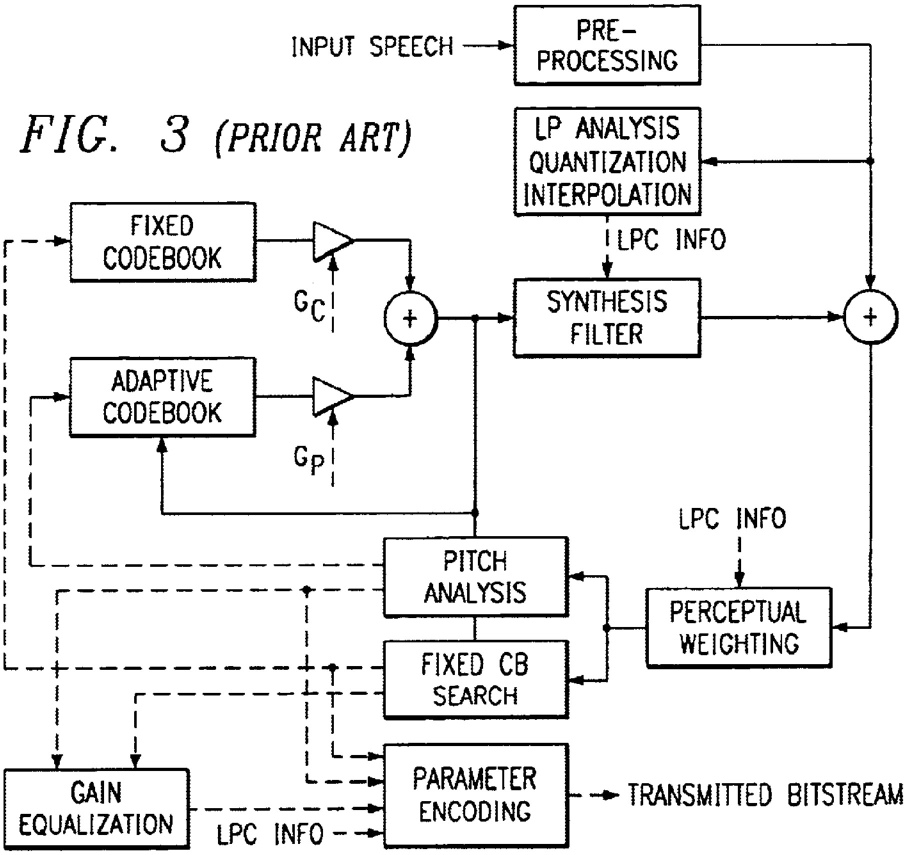
FIG. 5
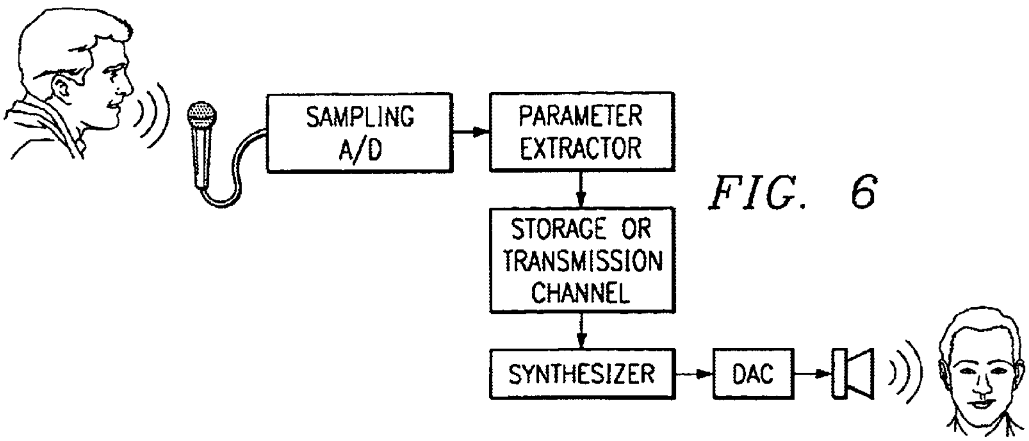
FIG. 6

CONCEALMENT OF FRAME ERASURES AND METHOD

CROSS-REFERENCE TO RELATED APPLICATIONS

This application claims priority from provisional application Ser. No. 60/167,197, filed Nov. 23, 1999.

BACKGROUND OF THE INVENTION

The invention relates to electronic devices, and more particularly to speech coding, transmission, storage, and decoding/synthesis methods and circuitry.

The performance of digital speech systems using low bit rates has become increasingly important with current and foreseeable digital communications. Both dedicated channel and packetized-over-network(e.g., Voice over IP or Voice over Packet) transmissions benefit from compression of speech signals. The widely-used linear prediction (LP) digital speech coding compression method models the vocal tract as a time-varying filter and a time-varying excitation of the filter to mimic human speech. Linear prediction analysis determines LP coefficients $a_i$, i=1, 2, . . . , M, for an input frame of digital speech samples {s(n)} by setting $$r(n)=s(n)+\Sigma_{M\geqq i\geqq 1}a_is(n-i) \quad (1)$$

and minimizing the energy $\Sigma r(n)^2$ of the residual r(n) in the frame. Typically, M, the order of the linear prediction filter, is taken to be about 10–12; the sampling rate to form the samples s(n) is typically taken to be 8 kHz (the same as the public switched telephone network sampling for digital transmission); and the number of samples {s(n)} in a frame is typically 80 or 160 (10 or 20 ms frames). A frame of samples may be generated by various windowing operations applied to the input speech samples. The name "linear prediction" arises from the interpretation of $r(n)=s(n)+\Sigma_{M\geqq i\geqq 1}a_i s(n-i)$ as the error in predicting s(n) by the linear combination of preceding speech samples $-\Sigma_{M\geqq i\geqq 1}a_i s(n\text{-}i)$. Thus minimizing $\Sigma r(n)^2$ yields the $\{a_i\}$ which furnish the best linear prediction for the frame. The coefficients $\{a_i\}$ may be converted to line spectral frequencies (LSFs) for quantization and transmission or storage and converted to line spectral pairs (LSPs) for interpolation between subframes.

The {r(n)} is the LP residual for the frame, and ideally the LP residual would be the excitation for the synthesis filter 1/A(z) where A(z) is the transfer function of equation (1). Of course, the LP residual is not available at the decoder; thus the task of the encoder is to represent the LP residual so that the decoder can generate an excitation which emulates the LP residual from the encoded parameters. Physiologically, for voiced frames the excitation roughly has the form of a series of pulses at the pitch frequency, and for unvoiced frames the excitation roughly has the form of white noise.

The LP compression approach basically only transmits/stores updates for the (quantized) filter coefficients, the (quantized) residual (waveform or parameters such as pitch), and (quantized) gain(s). A receiver decodes the transmitted/stored items and regenerates the input speech with the same perceptual characteristics. FIGS. 5–6 illustrate high level blocks of an LP system. Periodic updating of the quantized items requires fewer bits than direct representation of the speech signal, so a reasonable LP coder can operate at bits rates as low as 2–3 kb/s (kilobits per second).

However, high error rates in wireless transmission and large packet losses/delays for network transmissions demand that an LP decoder handle frames in which so many bits are corrupted that the frame is ignored (erased). To maintain speech quality and intelligibility for wireless or voice-over-packet applications in the case of erased frames, the decoder typically has methods to conceal such frame erasures, and such methods may be categorized as either interpolation-based or repetition-based. An interpolation-based concealment method exploits both future and past frame parameters to interpolate missing parameters. In general, interpolation-based methods provide better approximation of speech signals in missing frames than repetition-based methods which exploit only past frame parameters. In applications like wireless communications, the interpolation-based method has a cost of an additional delay to acquire the future frame. In Voice over Packet communications future frames are available from a playout buffer which compensates for arrival jitter of packets, and interpolation-based methods mainly increase the size of the playout buffer. Repetition-based concealment, which simply repeats or modifies the past frame parameters, finds use in several CELP-based speech coders including G.729, G.723.1 and GSM-EFR. The repetition-based concealment method in these coders does not introduce any additional delay or playout buffer size, but the performance of reconstructed speech with erased frames is poorer than that of the interpolation-based approach, especially in a high erased-frame ratio or bursty frame erasure environment.

In more detail, the ITU standard G.729 uses frames of 10 ms length (80 samples) divided into two 5-ms 40-sample subframes for better tracking of pitch and gain parameters plus reduced codebook search complexity. Each subframe has an excitation represented by an adaptive-codebook contribution and a fixed (algebraic) codebook contribution. The adaptive-codebook contribution provides periodicity in the excitation and is the product of v(n), the prior frame's excitation translated by the current frame's pitch lag in time and interpolated, multiplied by a gain, $g_P$. The algebraic codebook contribution approximates the difference between the actual residual and the adaptive codebook contribution with a four-pulse vector, c(n), multiplied by a gain, $g_C$. Thus the excitation is $u(n)=g_P\, v(n)+g_C\, c(n)$ where v(n) comes from the prior (decoded) frame and $g_P$, $g_C$, and c(n) come from the transmitted parameters for the current frame. FIGS. 3–4 illustrate the encoding and decoding in block format; the postfilter essentially emphasizes any periodicity (e.g., vowels).

G.729 handles frame erasures by reconstruction based on previously received information; that is, repetition-based concealment. Namely, replace the missing excitation signal with one of similar characteristics, while gradually decaying its energy by using a voicing classifier based on the long-term prediction gain (which is computed as part of the long-term postfilter analysis). The long-term postfilter finds the long-term predictor for which the prediction gain is more than 3 dB by using a normalized correlation greater than 0.5 in the optimal delay determination. For the error concealment process, a 10 ms frame is declared periodic if at least one 5 ms subframe has a long-term prediction gain of more than 3 dB. Otherwise the frame is declared nonperiodic. An erased frame inherits its class from the preceding (reconstructed) speech frame. Note that the voicing classification is continuously updated based on this reconstructed speech signal. The specific steps taken for an erased frame are as follows:

1) repetition of the synthesis filter parameters. The LP parameters of the last good frame are used.

2) attenuation of adaptive and fixed-codebook gains. The adaptive-codebook gain is based on an attenuated version of the previous adaptive-codebook gain: if the $(m+1)^{st}$ frame is erased, use $g_P^{(m+1)}=0.9\ g_P^{(m)}$. Similarly, the fixed-codebook gain is based on an attenuated version of the pervious fixed-codebook gain: $g_C^{(m+1)}=0.98\ g_C^{(m)}$.

3) attenuation of the memory of the gain predictor. The gain predictor for the fixed-codebook gain uses the energy of the previously selected algebraic codebook vectors c(n), so to avoid transitional effects once good frames are received, the memory of the gain predictor is updated with an attenuated version of the average codebook energy over four prior frames.

4) generation of the replacement excitation. The excitation used depends upon the periodicity classification. If the last reconstructed frame was classified as periodic, the current frame is considered to be periodic as well. In that case only the adaptive codebook contribution is used, and the fixed-codebook contribution is set to zero. The pitch delay is based on the integer part of the pitch delay in the previous frame, and is repeated for each successive frame. To avoid excessive periodicity the pitch delay value is increased by one for each next subframe but bounded by 143. In contrast, if the last reconstructed frame was classified as nonperiodic, the current frame is considered to be nonperiodic as well, and the adaptive codebook contribution is set to zero. The fixed-codebook contribution is generated by randomly selecting a codebook index and sign index. The use of a classification allows the use of different decay factors for either type of excitation (e.g., 0.9 for periodic and 0.98 for nonperiodic gains). FIG. 2 illustrates the decoder with concealment parameters.

Leung et al, Voice Frame Reconstruction Methods for CELP Speech Coders in Digital Cellular and Wireless Communications, Proc. Wireless 93 (July 1993) describes missing frame reconstruction using parametric extrapolation and interpolation for a low complexity CELP coder using 4 subframes per frame However, the repetition-based concealment methods have poor results.

SUMMARY OF THE INVENTION

The present invention provides concealment of erased frames by frame repetition together with one or more of: excitation signal muting, LP coefficient bandwidth expansion with cutoff frequency, and pitch delay jittering.

This has advantages including improved performance for repetition-based concealment.

BRIEF DESCRIPTION OF THE DRAWINGS

FIG. 3 is a block diagram of a known encoder.

FIGS. 5–6 illustrate speech compression/decompression systems.

DETAILED DESCRIPTION OF THE PREFERRED EMBODIMENTS

1. Overview

Figure 1:
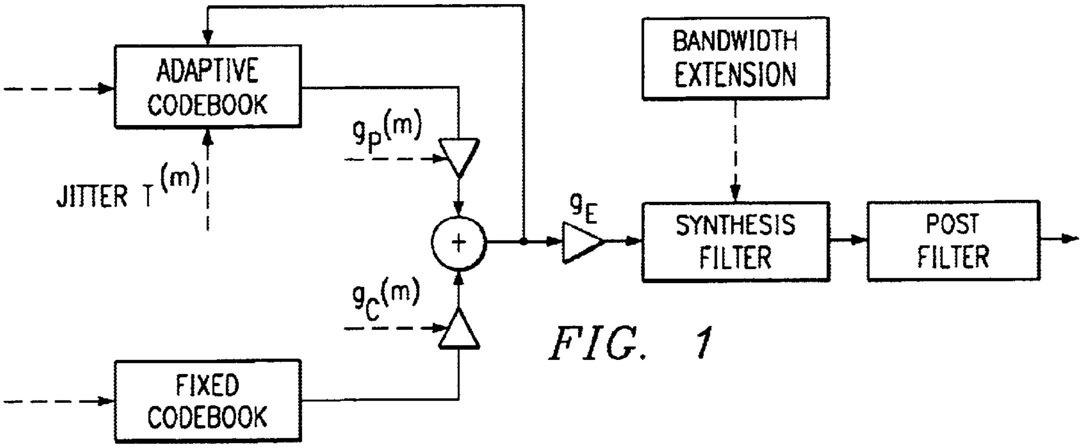
FIG. 1 shows a preferred embodiment decoder in block format.

Preferred embodiment decoders and methods for concealment of frame erasures in CELP-encoded speech or other signal transmissions have one or more of three features: (1) muting the excitation outside of the feedback loop, this replaces the attenuation of the adaptive and fixed codebook gains; (2) expanding the bandwidth of the LP synthesis filter with a threshold frequency for differing expansion factors; and (3) jittering the pitch delay to avoid overly periodic repetition frames. Features (2) and (3) especially apply to bursty noise leading to frame erasures. FIG. 1 illustrates a preferred embodiment decoder using all three concealment features; this contrasts with the G.729 standard decoder concealment illustrated in FIG. 2.

Preferred embodiment systems (e.g., Voice over IP or Voice over Packet) incorporate preferred embodiment concealment methods in decoders.

2. Encoder Details

Some details of coding methods similar to G.729 are needed to explain the preferred embodiments. In particular, FIG. 3 illustrates a speech encoder using LP encoding with excitation contributions from both adaptive and algebraic codebook, and preferred embodiment concealment features affect the pitch delay, the codebook gains, and the LP synthesis filter. Encoding proceeds as follows:

(1) Sample an input speech signal (which may be preprocessed to filter out dc and low frequencies, etc.) at 8 kHz or 16 kHz to obtain a sequence of digital samples, s(n). Partition the sample stream into frames, such as 80 samples or 160 samples (e.g., 10 ms frames) or other convenient size. The analysis and encoding may use various size subframes of the frames or other intervals.

(2) For each frame (or subframes) apply linear prediction (LP) analysis to find LP (and thus LSF/LSP) coefficients and quantize the coefficients. In more detail, the LSFs are frequencies $\{f_1, f_2, f_3, \ldots f_N\}$ monotonically increasing between 0 and the Nyquist frequency (4 kHz or 8 kHz for sampling rates of 8 kHz or 16 kHz); that is, $0<f_1<f_2 \ldots <f_M<f_{samp}/2$ and M is the order of the linear prediction filter, typically in the range 10–12. Quantize the LSFs for transmission/storage by vector quantizing the differences between the frequencies and fourth-order moving average predictions of the frequencies.

(3) For each subframe find a pitch delay, $T_j$, by searching correlations of s(n) with s(n+k) in a windowed range; s(n) may be perceptually filtered prior to the search. The search may be in two stages: an open loop search using correlations of s(n) to find a pitch delay followed by a closed loop search to refine the pitch delay by interpolation from maximizations of the normalized inner product $<x|y>$ of the target speech x(n) in the (sub)frame with the speech y(n) generated by the (sub)frame's quantized LP synthesis filter applied to the prior (sub)frame's excitation. The pitch delay resolution may be a fraction of a sample, especially for smaller pitch delays. The adaptive codebook vector v(n) is then the prior (sub)frame's excitation translated by the refined pitch delay and interpolated.

(4) Determine the adaptive codebook gain, $g_p$, as the ratio of the inner product $<x|y>$ divided by $<y|y>$ where x(n) is the target speech in the (sub)frame and y(n) is the (perceptually weighted) speech in the (sub)frame generated by the quantized LP synthesis filter applied to the adaptive codebook vector v(n) from step (3). Thus $g_p v(n)$ is the adaptive codebook contribution to the excitation and $g_p y(n)$ is the adaptive codebook contribution to the speech in the (sub) frame.

(5) For each (sub)frame find the algebraic codebook vector c(n) by essentially maximizing the normalized correlation of quantized-LP-synthesis-filtered c(n) with $x(n)-g_p y(n)$ as the target speech in the (sub)frame; that is, remove the adaptive codebook contribution to have a new target. In particular, search over possible algebraic codebook vectors c(n) to maximize the ratio of the square of the correlation <x−$g_p$y|H|c> divided by the energy <c|$H^T$H|c> where h(n) is the impulse response of the quantized LP synthesis filter (with perceptual filtering) and H is the lower triangular Toeplitz convolution matrix with diagonals h(0), h(1), . . . . The vectors c(n) have 40 positions in the case of 40-sample (5 ms) (sub)frames being used as the encoding granularity, and the 40 samples are partitioned into four interleaved tracks with 1 pulse positioned within each track. Three of the tracks have 8 samples each and one track has 16 samples.

(6) Determine the algebraic codebook gain, $g_c$, by minimizing |x−$g_p$y−$g_c$z| where, as in the foregoing description, x(n) is the target speech in the (sub)frame, $g_p$ is the adaptive codebook gain, y(n) is the quantized LP synthesis filter applied to v(n), and z(n) is the signal in the frame generated by applying the quantized LP synthesis filter to the algebraic codebook vector c(n).

(7) Quantize the gains $g_p$ and $g_c$ for insertion as part of the codeword; the algebraic codebook gain may factored and predicted, and the gains may be jointly quantized with a vector quantization codebook. The excitation for the (sub) frame is then with quantized gains u(n)=$g_p$v(n)+$g_c$c(n), and the excitation memory is updated for use with the next (sub)frame.

Note that all of the items quantized typically would be differential values with moving averages of the preceding frames' values used as predictors. That is, only the differences between the actual and the predicted values would be encoded.

The final codeword encoding the (sub)frame would include bits for: the quantized LSF coefficients, adaptive codebook pitch delay, algebraic codebook vector, and the quantized adaptive codebook and algebraic codebook gains.

4. Decoder Details

Figure 4:
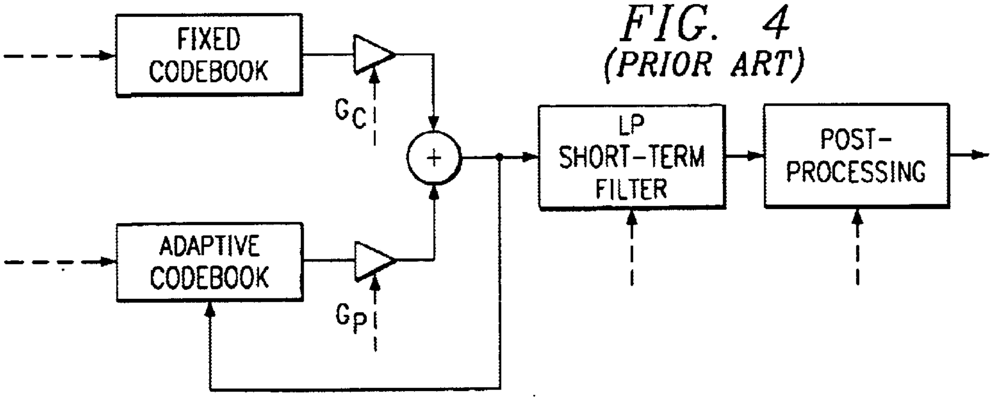
FIG. 4 (PRIOR ART)
FIG. 4 is a block diagram of a known decoder.

FIG. 1 illustrates preferred embodiment decoders and decoding methods which essentially reverse the encoding steps of the foregoing encoding method plus provide repetition-based concealment features for erased frame reconstructions as described in the next section. FIG. 4 shows a decoder without concealment features, and for the $m^{th}$ (sub)frame proceed as follows:

(1) Decode the quantized LP coefficients $a_j^{(m)}$. The coefficients may be in differential LSP form, so a moving average of prior frames' decoded coefficients may be used. The LP coefficients may be interpolated every 20 samples (subframe) in the LSP domain to reduce switching artifacts.

(2) Decode the adaptive codebook quantized pitch delay $T^{(m)}$, and apply (time translate plus interpolation) this pitch delay to the prior decoded (sub)frame's excitation $u^{(m-1)}$(n) to form the vector $v^{(m)}$(n); this is the feedback loop in FIG. 4.

(3) Decode the algebraic codebook vector $c^{(m)}$(n).

(4) Decode the quantized adaptive codebook and algebraic codebook gains, $g_P^{(m)}$ and $g_C^{(m)}$.

(5) Form the excitation for the $m^{th}$ (sub)frame as $u^{(m)}(n)=g_P^{(m)}v^{(m)}(n)+g_C^{(m)}c^{(m)}(n)$ using the items from steps (2)–(4).

(6) Synthesize speech by applying the LP synthesis filter from step (1) to the excitation from step (5).

(7) Apply any post filtering and other shaping actions.

5. Preferred Embodiment Concealments

Figure 2:
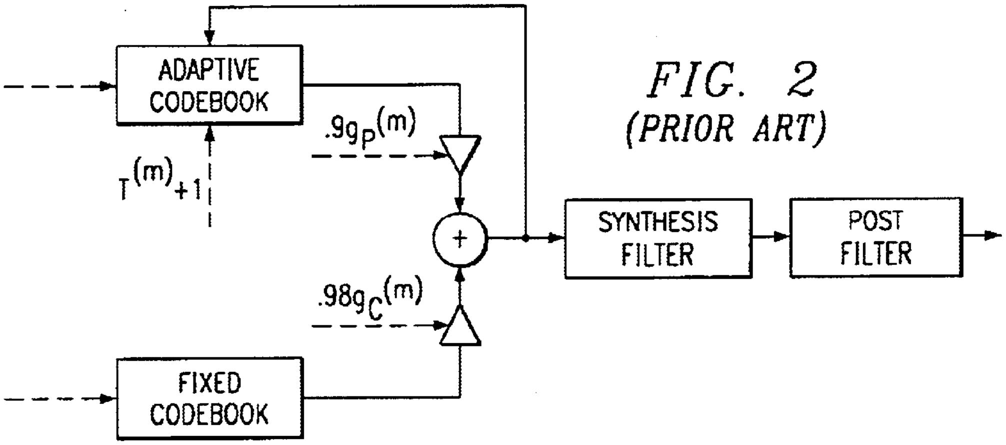
FIG. 2 (PRIOR ART)
FIG. 2 shows known decoder concealment.

FIG. 1 shows preferred embodiment concealment features in a preferred embodiment decoder and contrasts with FIG. 2. In particular, presume that the $m^{th}$ frame was decoded but the $(m+1)^{st}$ frame was erased as were the $(m+2)^{nd}$, . . . $(m+j)^{th}$ . . . frames. Then the preferred embodiment concealment features construct an $(m+j)^{st}$ frame with one or more of the following modified decoder steps:

(1) Define the LP synthesis filter (1/Â(z)) by taking the (quantized) filter coefficients $a_k^{(m+j)}$ to be bandwidth expanded versions of the prior good frame's (quantized) coefficients $a_k^{(m)}$:

$$a_k^{(m+j)}=(\gamma^{(m+j)})^k a_k^{(m)}$$

for j=1,2, . . . successive erased frames and where the bandwidth expansion factor $\gamma^{(n)}$ is confined to the range [0.8, 1.0]. FIG. 1 illustrates this bandwidth expansion applied to the synthesis filter. The decoder updates the bandwidth expansion factor every frame by:

$$\gamma^{(n+1)}=\max(0.95\,\gamma^{(n)},\,0.8) \text{ if } C_B>1 \text{ and } LSFBW_{min}<100 \text{ Hz}$$

$$\gamma^{(n+1)}=\min(1.05\,\gamma^{(n)},\,1.0) \text{ otherwise}$$

where $C_B$ is a bursty frame erasure counter which counts the number of consecutive erased frames, and $LSFBW_{min}$ is the minimum LSF bandwidth in the last good frame. The $i^{th}$ LSF bandwidth ($LSFBW_i$) is defined as $|f_{i+1}-f_i|$. The smaller an LSF bandwidth, the sharper the corresponding LPC spectrum peak (formant). That is, $LSFBW_{min}$ is the minimum $LSFBW_i$, and so the bandwidth expansion factor may decrease only if at least one pair of LSF frequencies are close together (a sharp formant). Note that for $\gamma^{(n)}$ decreasing the poles of the synthesis filter $1/\hat{A}(z/\gamma^{(n)})$ move radially towards the origin and thereby expand the formant peaks.

Thus with the $m^{th}$ frame a good frame and the $(m+1)^{st}$ frame erased, the counter $C_B$=1 and the updated expansion factor is $\gamma^{(m+1)}=\min(1.05\,\gamma^{(m)}, 1.0)$. (For $\gamma^{(m+1)}=1.05\,\gamma^{(m)}\leqq 1$, $\gamma^{(m)}$ must have been at most about 0.953; this means that at least one of the preceding four frames had a $\gamma^{(n)}$ decrease which implies at least two successive erased frames.) But with the $(m+2)^{nd}$ or more erased frames and an $LSFBW_{min}$ of the $m^{th}$ frame less than 100 Hz, the factors $\gamma^{(m+j)}$ progressively decrease to the limit of 0.8. This suppresses any sharp formant ($LSFBW_{min}$<100 Hz) in the $m^{th}$ frame from leading to a synthetic quality in the concealment reconstructions for the $(m+2)^{nd}$ and later successive erased frames. That is, the synthesis filter is $1/\hat{A}(z/\gamma^{(m+j)})$ for concealing the erased $(m+j)^{th}$ frame where the filter coefficients $a_k^{(m)}$ are from the last good frame.

Also, for good frames following bursty frame erasures, $\gamma^{(m+j)}$ is still applied to the decoded filter coefficients and progressively increased up to 1.0 for a smooth recovery from frame erasures through $\gamma^{(m+j+1)}=\min(1.05\,\gamma^{(m+j)}, 1.0)$.

(2) Define the adaptive codebook quantized pitch delay $T^{(m+1)}$ for concealing the erased $(m+1)^{st}$ frame as equal to $T^{(m)}$ from the good prior $m^{th}$ frame. However, for two or more consecutive erased frames, add a random 3% jitter to $T^{(m)}$ to define $T^{(m+j)}$ for j=2, 3, . . . erased frames. This avoids reconstructing an excessively periodic concealment signal without accumulating estimation errors which may occur if the $T^{(m+j+1)}$ is just taken to be $T^{(m+j)}$+1 as in G.729. Apply this concealing pitch delay to the prior (sub)frame's excitation $u^{(m)}$(n) to form the adaptive codebook vector $v^{(m+j)}$(n). In short, apply a random number in the range of [−0.03 $T^{(m)}$, 0.03 $T^{(m)}$] to $T^{(m)}$ and round off to the nearest ⅓ or integer, depending upon range, to obtain $T^{(m+j)}$ for a consecutive erased frame. FIG. 1 shows the jitter, and the feedback loop shows the use of the prior frame's excitation.

(3) Define the algebraic codebook vector $c^{(m+j)}$(n) as a random vector of the type of $c^{(m)}$(n); that is, for G.729-type coding the vector has four ±1 pulses out of 40 otherwise-zero components.

(4) Define the quantized adaptive codebook gain, $g_P^{(m+j)}$, and algebraic codebook gain, $g_C^{(m+j)}$, simply as equal to $g_P^{(m)}$ and $g_C^{(m)}$, except $g_P^{(m+j)}$ has an upper bound of max(1.2–0.1 ($C_B$–1), 0.8). Again, $C_B$ is a count of the number of consecutive erased frames; i.e., a burst. The upper bound prevents an unpredicted surge of excitation signal energy. This use of the unattenuated gains maintains the excitation energy; however, the excitation is muted prior to synthesis by applying the factor $g_E^{(m+j)}$ as described in step (5).

(5) Form the excitation for the erased $(m+1)^{th}$ (sub)frame as $u^{(m+1)}(n)=g_P^{(m+1)}v^{(m+1)}(n)+g_C^{(m+1)}c^{(m+1)}(n)$ using the items from steps (2)–(4). Then apply the excitation muting factor $g_E^{(m+1)}$ outside of the adaptive codebook feedback loop as illustrated in FIG. 1. This eliminates excessive decay of the excitation but still avoids a surge of speech energy as occurs if erased frames follow a frame containing an onset of a vowel. The excitation muting factor $g_E^{(n)}$ is updated every subframe (5 ms) and lies in the range [0.0, 1.0]; the updating depends upon the muting counter $C_M$ which is updated every frame (10 ms) as follows:

if $C_B>1$, then $C_M=4$ else if $g_P^{(m+1)}<1.0$ and $C_M>0$, then decrement $C_M$ by 1 else, no change in $C_M$ where $C_B$ again is the bursty counter which counts consecutive number of erased frames and $g_P^{(m+1)}$ is the algebraic codebook gain from step (4) Then the $g_E^{(n)}$ updating is:

$$g_E^{(n+1)}=0.95499\ g_E^{(n)} \text{ if } C_M^{(n+1)}>0$$

$$g_E^{(n+1)}=\min(1.09648\ g_E^{(n)},\ 1.0) \text{ otherwise}$$

Thus the excitation to the synthesis filter becomes $g_E^{(m+1)}u^{(m+1)}(n)$.

Similarly for the $(m+j)^{th}$ consecutive erased frame using the corresponding $g_P^{(m+j)}v^{(m+j)}(n)+g_C^{(m+j)}c^{(m+j)}(n)$ and muting with $g_E^{(m+j)}$.

(6) Synthesize speech by applying the LP synthesis filter from step (1) to the excitation from step (5).

(7) Apply any post filtering and other shaping actions.

6. Alternative Preferred Embodiments

Alternatives preferred embodiments perform only one or two of the three concealment features of the preceding preferred embodiments. Indeed, the bandwidth expansion of the LP coefficients for the erased frames and for the good frames after a burst of erased frames could be omitted. This just changes the synthesis filter and does not affect the excitation muting or pitch delay jittering.

Another alternative preferred embodiment omits the pitch delay jittering but may use the incrementing as in G.729 for erased frames together with excitation muting and LP coefficient bandwidth expansion.

Further, an alternative preferred embodiment omits the excitation muting and uses the G.729 construction together with the pitch delay jittering and synthesis filter coefficient bandwidth expansion.

Lastly, preferred embodiments may use just one of the three features (excitation muting, pitch delay jittering, and synthesis filter bandwidth expansion) and follow G.729 in other aspects.

7. System Preferred Embodiments

FIGS. 5–6 show in functional block form preferred embodiment systems which use the preferred embodiment encoding and decoding. This applies to speech and also other signals which can be effectively CELP coded. The encoding and decoding can be performed with digital signal processors (DSPs) or general purpose programmable processors or application specific circuitry or systems on a chip such as both a DSP and RISC processor on the same chip with the RISC processor controlling. Codebooks would be stored in memory at both the encoder and decoder, and a stored program in an onboard or external ROM, flash EEPROM, or ferroelectric memory for a DSP or programmable processor could perform the signal processing. Analog-to-digital converters and digital-to-analog converters provide coupling to the real world, and modulators and demodulators (plus antennas for air interfaces) provide coupling for transmission waveforms. The encoded speech can be packetized and transmitted over networks such as the Internet.

8. Modifications

The preferred embodiments may be modified in various ways while retaining one or more of the features of erased frame concealment by synthesis filter coefficient bandwidth expansion, pitch delay jittering, and excitation muting.

For example, interval (frame and subframe) size and sampling rate could differ; the bandwidth expansion factor could apply for $C_B>0$ or $C_B>2$, the multipliers 0.95 and 1.05 and limits 0.8 and 1.0 could vary, and the 100 Hz threshold could vary; the pitch delay jitter could be with a larger or smaller percentage of the pitch delay and could also apply to the first erased frame, and the jitter size could vary with the number of consecutive erased frames or erasure density; the excitation muting could vary nonlinearly with number of consecutive erased frames or erasure density, and the multipliers 0.95499 and 1.09648 could vary.

What is claimed is:

1. A method for decoding digital speech, comprising:

(a) forming an excitation for an erased interval of encoded digital speech by a sum of an adaptive codebook contribution and a fixed codebook contribution where said adaptive codebook contribution derives from an excitation and pitch and first gain of intervals prior in time of said encoded digital speech and said fixed codebook contribution derives from a second gain of said intervals prior in time;

(b) muting said excitation; and (c) filtering said muted excitation.

2. The method of claim 1, wherein:

(a) said filtering includes a synthesis, with synthesis filter coefficients derived from filter coefficients of said intervals prior in time.

3. A method for decoding digital speech, comprising:

(a) forming an excitation for an erased interval of encoded digital speech by a sum of an adaptive codebook contribution and a fixed codebook contribution where said adaptive codebook contribution derives from an excitation and pitch and first gain of intervals prior in time of said encoded digital speech with said pitch jittered randomly, and said fixed codebook contribution derives from a second gain of said intervals prior in time; and (b) filtering said excitation.

4. The method of claim 3, wherein:

(a) said filtering includes a muting followed by a synthesis with synthesis filter coefficients derived from synthesis filter coefficients of said intervals prior in time.

5. The method of claim 4, further comprising:

(a) determining synthesis filter coefficients for said interval from bandwidth expanded versions of synthesis filter coefficients of intervals prior in time of said encoded digital speech.

6. A decoder for CELP encoded signals, comprising:

(a) a fixed codebook vector decoder;

(b) a fixed codebook gain decoder;

(c) an adaptive codebook gain decoder;

(d) an adaptive codebook pitch delay decoder;

(e) an excitation generator coupled to said decoders;

(f) a synthesis filter;

(g) a muting gain coupled between an output of said excitation generator and an input to said synthesis filter;

(h) wherein when a received frame is erased, said decoders generate substitute outputs, said excitation generator generates a substitute excitation, said synthesis filter generates substitute filter coefficients, and said muting gain mutes said substitute excitation.

7. The decoder of claim 6, wherein:

(a) said fixed codebook decoder and said adaptive codebook decoder both generate said substitute outputs by repeating the outputs for the prior frame.

* * * * *